April 3, 1928.  1,664,495
H. VADERSEN
VARIABLE INDUCTANCE APPARATUS
Filed Feb. 26, 1924  2 Sheets-Sheet 1
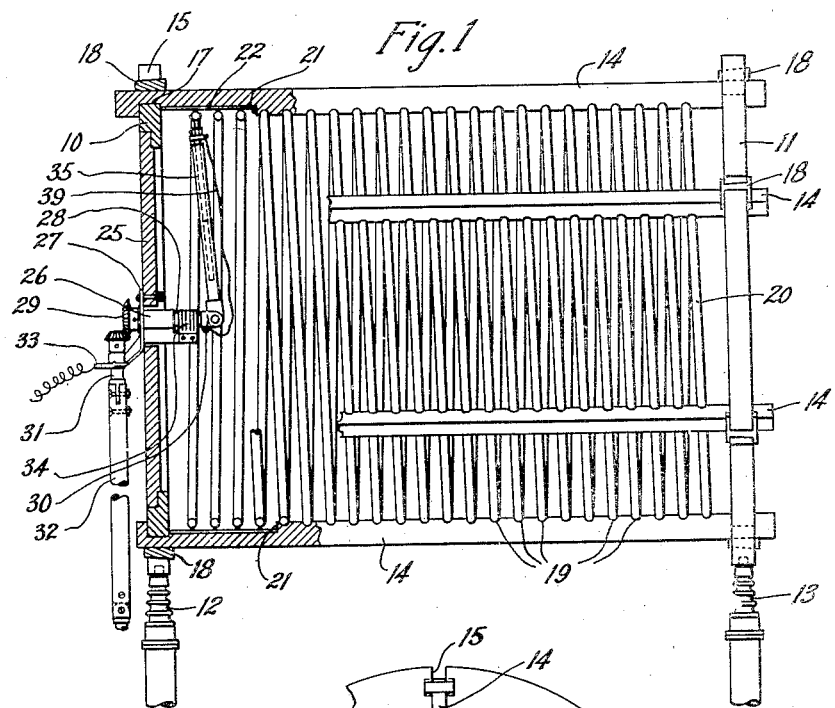
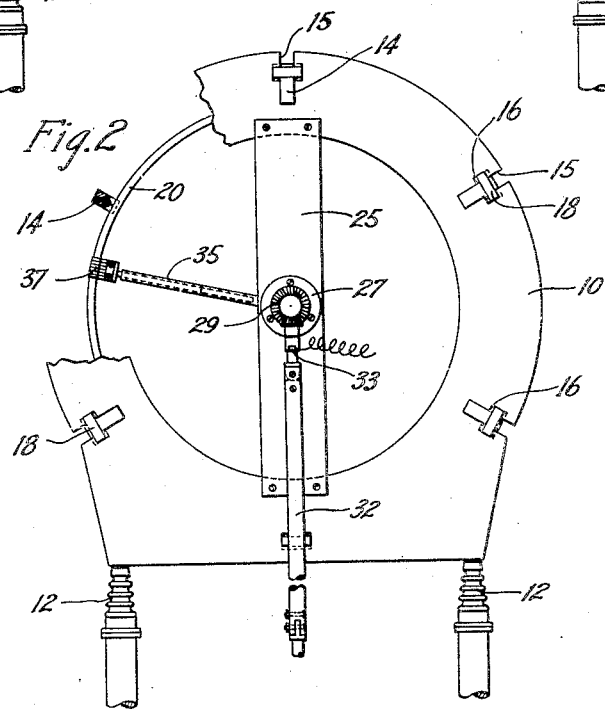
Inventor:
Herbert Vadersen,
by ⎯⎯⎯ Atty April 3, 1928.  H. VADERSEN  1,664,495
VARIABLE INDUCTANCE APPARATUS
Filed Feb. 26, 1924  2 Sheets-Sheet 2
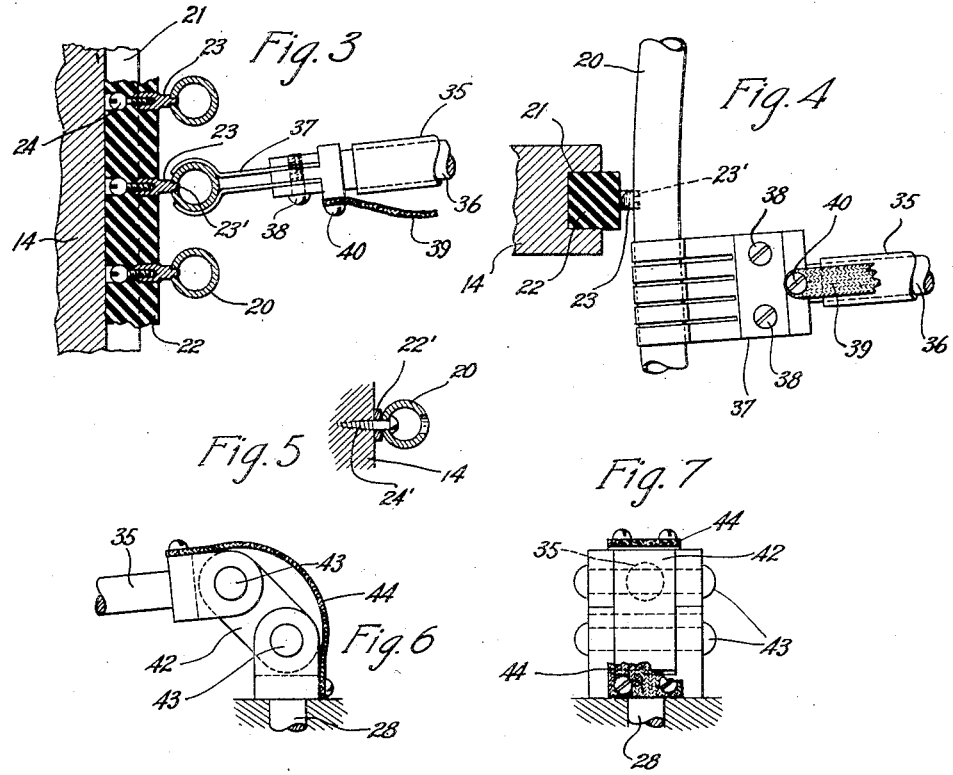
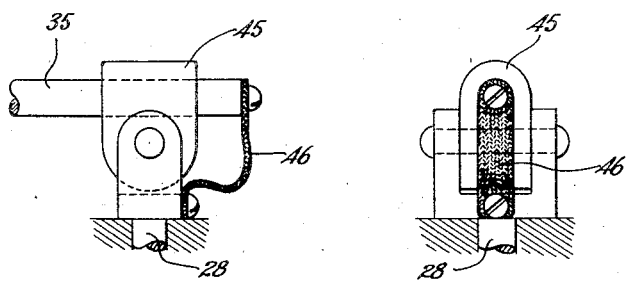
Inventor:
Herbert Vadersen,
by —— R. W. Adams Atty.

Patented Apr. 3, 1928.

1,664,495

UNITED STATES PATENT OFFICE.

HERBERT VADERSEN, OF ELIZABETH, NEW JERSEY, ASSIGNOR TO WESTERN ELECTRIC COMPANY, OF NEW YORK, N. Y., A CORPORATION OF NEW YORK.

VARIABLE-INDUCTANCE APPARATUS.

Application filed February 26, 1924. Serial No. 695,214.

This invention relates to variable inductance apparatus and is particularly adapted to inductance coils suitable for use in high power radio transmitters.

An object of the invention is to provide an inductance coil of the above character which is simple in construction, reliable in operation, and which is capable of fine adjustment over a limited range of the coil.

A related object of the invention is to construct a coil of the above character having a small number of operating parts which may be readily assembled, adjusted and replaced as desired.

The invention is of particular advantage in inductance coils of large mechanical dimensions in which great strength and rigidity is an essential feature. Such a coil is disclosed in U. S. Patent No. 1,647,615 granted to J. O. Gargan November 1, 1927, in which a helical conductor is mounted in a skeleton framework of strong and durable construction.

In accordance with a feature of the invention fine adjustment over a limited range of the coil is obtained by means of a contact arm mounted inside the coil and carrying a contact wiper which is adapted to sweep over a few of the end turns thereof. The contact wiper firmly grips the helical conductor and the contact arm is so constructed as to lengthen and shorten as it rotates to compensate for the travel of the wiper over the conductor.

The end turns of the conductor which are adapted to be engaged by the contact wiper are fixed to the framework of the coil by means of a novel construction which permits the wiper to substantially encircle the portion of the conductor with which it comes in contact. By means of this arrangement the wiper is permitted to maintain a firm grip on the conductor at all times.

Other features and advantages of the invention will be apparent from the consideration of the following description taken in connection with the accompanying drawings, in which Fig. 1 is a front elevation, partly broken away and partly in section, showing one form of the invention.

Fig. 2 is a side elevation, partly broken away, of the structure shown in Fig. 1.

Fig. 3 is a fragmentary front sectional view showing the method of fastening the end turns of the coil to the framework.

Fig. 4 is a fragmentary side view of the structure shown in Fig. 3.

Fig. 5 is a fragmentary view of a modification of the structure shown in Figs. 3 and 4.

Figs. 6 and 7 are fragmentary front and side views, respectively, illustrating a modified construction for mounting the contact arms.

Figs. 8 and 9 are fragmentary front and side views, respectively, illustrating another form of mounting for the contact arm.

As shown in Figs. 1 and 2, the skeleton coil construction comprises a pair of substantially circular end frames 10 and 11 which may be mounted on suitable insulators 12 and 13, respectively. A plurality of longitudinal cross bars 14 preferably of rectangular cross section extend between and connect the end frames 10 and 11. The frames 10 and 11 and the cross bars 14 may be of any suitable insulating material, such as wood. The edges of the end frames 10 and 11 are slotted at corresponding points 15 about the circumference located at points equi-distant from a common central point on the end frames. For the sake of strength, uniformity and neatness of construction, the slots 15 are spaced an equal distance apart, those shown in Fig. 2, for example, being separated a distance of about 60 degrees. Cross slots 16 are formed in the frames 10 and 11 extending through and substantially at right angles to each of the slots 15, thus forming shoulders in the slots 15, the upper shoulder extending through each of the slots 15 being preferably beveled or inclined.

The cross bars 14 are formed adjacent their ends with notches 17 therein corresponding in length and width to the slots 15 in end frames 10 and 11. The ends of the cross bars 14 are inserted through the open ends of the slots 15 and the notches 17 are positioned in the lower ends of the slots 15 to form a double notch joint therewith. The depth of the notches 17 is such that when the cross bars 14 are in position, as shown in Figs. 1 and 2, there is sufficient clearance in the cross slots 16 to permit the insertion of wedge members 18 therein. The wedges 18, when forced between the cross bars 14 and the upper inclined shoulders formed by the slots 16, serve to lock the end frames and the cross bars firmly together.

A plurality of grooves 19 are formed in the inner face of each of the cross bars 14. A helical conductor 20 which may be in the form of a copper tubing is mounted between the cross bars 14, the various convolutions of the conductor, with the exception of several turns at one end of the coil, resting in the grooves 19. Three or four of the end turns of the conductor 20 are mounted between the cross bars 14 in a different manner, as hereinafter described.

The inner faces of the cross bars 14 are each provided adjacent one end with an elongated slot or groove 21, as shown in Figs. 1, 3 and 4. A plate 22, preferably formed of stiff insulating material such as micarta, is adapted to be inserted in each of the slots or grooves 21, each of these plates being of such a size as to fit snugly into its respective slot to prevent lateral or longitudinal movement therein. A plurality of circular holes are drilled through each of the micarta plates 22 and are of a number corresponding to the convolutions of the conductor 20 which it is desired to support thereon. These holes are an equal distance apart corresponding to the pitch of the helical conductor 20.

The various convolutions of the conductor 20 are provided at the points where the conductor is to be fastened to the cross bars with extending lugs 23 which may be formed integral therewith or which may be welded or otherwise fastened thereto. Preferably, however, the lugs 23 are formed on one end with two or more pins 23' which are inserted in corresponding holes in the tubular conductor 20, as shown in Fig. 4, to prevent the lugs from turning and the lugs are then firmly soldered in place. Each of the lugs is provided at its opposite end with an internally threaded tap adapted to receive the threaded end of a ball-headed screw 24 which is insertable through the opposite end of the micarta plate 22. The lugs 23 extend through the holes in the micarta plate 22 a sufficient distance to hold the helical conductor 20 out of engagement with the micarta plate 22 for a purpose hereinafter to be described, and the screws 24 when fastened in place serve to hold the end turns of the conductor 20 firmly in position as shown in Fig. 3. The lugs 23 are also preferably milled flat at the end upon which the pins 23' are formed for the purpose of reducing their diameter at this point. When the various micarta plates 22 have been fastened firmly to the respective turns of the conductor 20 these plates are then inserted in their respective slots or grooves 21 in assembling the coil. The assembly is facilitated by the construction of the skeleton framework which permits the insertion of the cross bars 14 sidewise of the end frames 10 and 11 through the slots 15. Thus, one micarta plate 22 may be inserted in its respective slot 21 whereupon another cross bar 14 may be lowered in place in such a way that another of the micarta plates 22 will be lodged in the elongated slot 21 thereof, the remaining convolutions of the helical conductor 20 resting in the respective grooves 19.

While the construction shown in Figs. 3 and 4 is desirable when facility in assembling and disassembling the coil is required, various other constructions may be employed to maintain the conductor free and clear of the framework of the coil. In Fig. 5, for example, the conductor is fastened to the cross bar 14 by means of a screw 24' which passes through a spacing block 22' serving to hold the conductor clear of the cross bar. The screw 24' may be inserted through an opening in the upper part of the tubular conductor.

A mounting plate 25 is fixed to the end frame 10 spanning the space between the inner edges thereof. The plate 25 is provided at a point centrally located with respect to the various points on the circumference of the end frame 10 with a recess adapted for the reception of a bearing bushing 26. The bearing bushing 26 is firmly fastened in place by means of bolts which clamp the outer flange 27 thereof to the mounting plate 25. A shaft 28 is journaled in the bearing bushing 26 and is formed on one end with a beveled gear 29 and on the other with a forked extension 30. A second shaft 31 is journaled in a bearing formed in the lower depending portion of the flange 27. The shaft 31 is formed on one end with a beveled gear adapted to mesh with the gear 29 and on the other end with an extension which is clamped by suitable bolts to a rotatable shaft 32. The depending portion of the flange 27 is also provided with a tapped hole 33 or other suitable means for connection to an external circuit. A flexible brush 34 comprising a plurality of contact fingers is mounted on the inner end of the bearing bushing 26 and is adapted to make electrical contact at all times with the shaft 28. A tubular contact arm 35 is pivoted to the forked end 30 of the shaft 28 and is adapted to rotate therewith. A rod 36 is slidable in the tubular arm 35 and is provided on its exposed end with a flexible contact wiper 37. The wiper 37 comprises two flexible brushes each having a plurality of rounded contact fingers which cooperate to encircle the tubular conductor 20. Clamping screws 38 are provided adjacent the end of the rod 36 for tightening these contact fingers about the conductor 20. A braided conductor 39 is clamped at one end by means of a screw 40 to the end of the rod 36 adjacent the contact wiper 37 and at the other end to the shaft 28 adjacent the forked end 30 thereof. By means of the conductor 39 a good electrical connection is formed between the contact wiper 37 and the shaft 28, and thence by means of the brush 34 to the flange 27 in which the tapped hole 33 is formed. It will be seen that with the parts of the coil in the position shown in Figs. 1 and 2, any rotation of shaft 32 which may be operated by means of any suitable handle or control mechanism not shown, will be imparted to the contact arm 35, thus causing the contact wiper 37 to sweep over the end turns of the helical conductor 20. As the tubular contact arm 35 rotates the slidable rod 36 will move up and down therein, lengthening and shortening, depending upon the direction of rotation. As the arm 35 is rotated the contact wiper 37 will at all times maintain a firm grip upon the helical conductor 20 thus establishing an electrical connection between the bearing 26 and flange 27 thereof and the portion of the conductor 20 with which the contact wiper 37 is in engagement. It will also be seen that the contact wiper 37 has no difficulty passing by the lugs 23 the exposed portions of which are milled flat and offer no obstruction thereto.

The arcuate range of the contact arm 35 is preferably determined by means of suitable stop pins, not shown, which may be associated with the rotatable shaft 32 or with the control handle thereof. The range of rotation of the arm 35 might also be controlled by the edge of the elongated slot 21 which acts as an obstruction to the further passage of the contact wiper 37, or by means of a stop pin disposed at the desired point on the helical conductor 20 to prevent the passage of the contact wiper 37 therebeyond. This latter construction, however, is not desirable on coils of large dimensions since if the shaft 32 continued to rotate when the end of travel had been reached, the strain upon the contact arm 35 and associated parts might be very great. Other means, however, may be employed to limit the range of rotation to the end turns of the coil.

A modified construction of the arrangement for pivoting the contact arm 35 is shown in Figs. 6 and 7. In this case, the contact arm is joined to the shaft 28 by means of a link 42 pivoted between the forked ends of the shaft 28 and the contact arm 35 by means of bolts 43. A braided conductor 44 serves to electrically connect the contact arm 35 with the shaft 28. The tubular construction of the arm 35 and the sliding rod 36 are dispensed with in this construction, the movement of the link 42 serving automatically to compensate for the movement of the contact arm 35 as it sweeps over the various convolutions of the conductor 20.

In Figs. 8 and 9 the contact arm 35 is shown slidably mounted in a block 45 which is pivoted in the forked end of the shaft 28. As the shaft 28 is rotated the contact arm 35 slides in and out of the block 45 to compensate for the varying distances of the block 45 from the point of contact with the helical conductor 20. In this case, a braided conductor 46 serves to electrically connect the shaft 28 with the end of the contact arm 35.

Certain changes in the details of the constructions herein shown and described may obviously be made without departing from the scope and spirit of the invention as defined in the following claims.

What is claimed is:

1. In combination, a cylindrical coil comprising a helical conductor, a rotatable shaft positioned coincident with the axis of said coil, a support pivoted upon said shaft, a contact arm slidable in said support, and a contact wiper on said arm engaging said conductor.

2. In combination, a cylindrical coil comprising a helical conductor of circular cross section, a rotatable shaft positioned coincident with the axis of said coil, a support pivoted upon said shaft, a contact arm slidable in said support, and a contact wiper on said contact arm substantially encircling said conductor.

3. A cylindrical electrical coil comprising a plurality of supporting members, a helical conductor mounted between said members, several end turns of said conductor standing out from said members at the points of engagement therewith, a rotatable shaft extending within said end turns, a contact arm of variable effective length carried by said shaft, and a contact wiper on said arm gripping one of the end turns of said conductor.

4. An electrical coil comprising a pair of end frames, a plurality of cross-bars connecting said frames, a plurality of grooves on the inner faces of each of said cross-bars, a helical conductor having a plurality of convolutions disposed in said grooves, several end turns of said conductor being substantially clear of said cross-bars, a rotatable shaft extending within said end turns, a contact arm carried by said shaft, a contact wiper on said arm substantially encircling one of said end turns, and means for varying the effective length of said contact arm to permit it to follow along said helical conductor.

5. An electrical coil comprising a pair of end frames, a plurality of removable cross-bars connecting said frames, a helical conductor mounted between said cross-bars, lugs holding each of several end turns of said conductor on and substantially clear of said cross-bars, a rotatable shaft extending within said end turns, a pivot block carried by said shaft, a rod slidable in said pivot block, and a contact wiper on said rod gripping said conductor and adapted to follow around said end turns.

6. A cylindrical electrical coil comprising a plurality of supporting members, a helical conductor mounted between said members, several end-turns of said conductor being supported by but held substantially clear of said supporting members, a rotatable shaft positioned coincident with the axis of said coil, a contact arm of variable length carried by said shaft, and a contact wiper on said arm substantially encircling the circumference of said conductor.

In witness whereof, I hereunto subscribe my name this 23rd day of February, A. D. 1924.

HERBERT VADERSEN.